United States Patent
Bruns et al.

(10) Patent No.: US 11,872,703 B2
(45) Date of Patent: Jan. 16, 2024

(54) METHOD AND DEVICE FOR DETERMINISTIC SAMPLING-BASED MOTION PLANNING

(71) Applicant: Robert Bosch GmbH, Stuttgart (DE)

(72) Inventors: Leonard Bruns, Täby (SE); Kai Oliver Arras, Stuttgart (DE); Luigi Palmieri, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 294 days.

(21) Appl. No.: 17/236,430

(22) Filed: Apr. 21, 2021

(65) Prior Publication Data

US 2021/0339394 A1 Nov. 4, 2021

(30) Foreign Application Priority Data

Apr. 29, 2020 (EP) .................................. 20172024

(51) Int. Cl.
*B25J 9/16* (2006.01)

(52) U.S. Cl.
CPC ........... *B25J 9/1666* (2013.01); *B25J 9/1676* (2013.01)

(58) Field of Classification Search
CPC ................ B25J 9/1666; B25J 9/1676; G05B 2219/40438; G01C 21/3446
See application file for complete search history.

(56) References Cited

U.S. PATENT DOCUMENTS

2019/0321980 A1* 10/2019 Gupta ................... B25J 9/1666

OTHER PUBLICATIONS

J. Rosell and M. Heise, "An efficient deterministic sequence for sampling-based motion planners," The 6th IEEE International Symposium on Assembly and Task Planning: From Nano to Macro Assembly and Manufacturing, 2005., Montreal, QC, Canada, 2005, pp. 212-217, doi: 10.1109/ISATP.2005.1511 (Year: 2005).*
Rosell, J., Roa, M., Pérez, A. et al. A General Deterministic Sequence for Sampling d-Dimensional Configuration Spaces. J Intell Robot Syst 50, 361-373 (2007). https://doi.org/10.1007/s10846-007-9170-9 (Year: 2007).*
A. F. Golda, S. Aridha and D. Elakkiya, "Algorithmic agent for effective mobile robot navigation in an unknown environment," 2009 International Conference on Intelligent Agent & Multi-Agent Systems, Chennai, India, 2009, pp. 1-4, doi: 10.1109/IAMA.2009.5228050. (Year: 2009).*

(Continued)

*Primary Examiner* — Khoi H Tran
*Assistant Examiner* — Rodney P King
(74) *Attorney, Agent, or Firm* — NORTON ROSE FULBRIGHT US LLP; Gerard A. Messina

(57) ABSTRACT

A computer-implemented method for planning an optimized motion path. The optimized motion path is determined applying a sampling-based motion-planning algorithm depending on a sample node set including sample nodes. The sample nodes in the sample node set are deterministically selected from a configuration node set including all obstacle free nodes. The sample nodes are selected to optimize a given dispersion criterion. The dispersion criterion selects the sample nodes so that the largest uncovered area/space within the configuration node set is as small as possible.

8 Claims, 5 Drawing Sheets

(56) References Cited

OTHER PUBLICATIONS

Khaksar W, Hong TS, Khaksar M, Motlagh O. A Low Dispersion Probabilistic Roadmaps (LD-PRM) Algorithm for Fast and Efficient Sampling-Based Motion Planning. International Journal of Advanced Robotic Systems. 2013;10(11). doi:10.5772/56973 (Year: 2013).*

R. Allen and M. Pavone, "Toward a real-time framework for solving the kinodynamic motion planning problem," 2015 IEEE International Conference on Robotics and Automation (ICRA), Seattle, WA, USA, 2015, pp. 928-934, doi: 10.1109/ICRA.2015.7139288. (Year: 2015).*

Janson L, Ichter B, Pavone M. Deterministic sampling-based motion planning: Optimality, complexity, and performance. The International Journal of Robotics Research. 2018;37(1):46-61. doi:10.1177/0278364917714338 (Year: 2018).*

Hart, et al., "A Formal Basis for the Heuristic Determination of Minimum Cost Paths," IEEE Transactions on Systems Science and Cybernetics, vol. 4, No. 2, pp. 100-107. <http://ai.stanford.edu/users/nilsson/OnlinePubs-Nils/PublishedPapers/astar.pdf> Downloaded Apr. 21, 2021.

Dijkstra, "A Note on Two Problems in Connexion With Graphs," Numerische Mathematik 1, 1959, pp. 269-271. <http://www-m3.ma.turn.de/foswiki/pub/MN0506/WebHome/dijkstra.pdf> Downloaded Apr. 21, 2021.

Palmieri, et al., "Dispertio: Optimal Sampling for Safe Deterministic Motion Planning," IEEE Robotics and Automation Letters, vol. 5. No. 2, 2020, pp. 362-368.

* cited by examiner

Fig. 5

```
1:   procedure PRM*
2:     S ← SAMPLEFREE(n)                              S1
3:     V ← {x_start, x_goal} ∪ S                      S2
4:     for v in V do                                  S7
5:         U ← NEAR(V,v,r,|V|)                        S3,S4
6:         for u in U do
7:             if COLLISIONFREE (v,u) then            S5
8:                 E ← E ∪ {(v,u)}                    S6
9:             end if
10:        end for
11:    end for
12:    return SHORTESTPATH (x_start, x_goal, (V,E))   S8
13:  end procedure
```

Fig. 6

```
1:   procedure DISPERTIO
2:     D ← ∞                                          ⎫
3:     x = U(X), S ← { }                              ⎬ S11
4:     while |S| < m_samples do                       S12
5:         b ← AFFECTEDBORDERPOINT (D,x)              S13
6:         if b=None then
7:             UPDATEDISTANCEMATRIX(D,x)              S16
8:             S ← S ∪ {x}                            S15
9:         else
10:            UPDATEDISTANCEMATRIX(D,b)              S14
11:        end if
12:        x ← arg max_c D_c
13:    end while
14:  end procedure
```

Fig. 7

```
1:  function AFFECTEDBORDERPOINT(D,x)
2:      for c in D do
3:          if dist(c,x) < $D_c$ ∧ ISBORDERPOINT (c) then
4:              return c
5:          end if
6:      end for
7:      return None
8:  end function
```

METHOD AND DEVICE FOR DETERMINISTIC SAMPLING-BASED MOTION PLANNING

CROSS REFERENCE

The present application claims the benefit under 35 U.S.C. § 119 of European Patent Application No. EP 20172024.0 filed on Apr. 29, 2020, which is expressly incorporated herein by reference in its entirety.

FIELD

The present invention relates to motion planning for autonomous agents, such as computer-controlled machines, such as a robot, a vehicle or the like.

BACKGROUND INFORMATION

Motion planning is essential for self-moving agents, such as robots or autonomous vehicles. For motion planning in safety-critical applications, such as in environments where robots collaborate with humans, safety guarantees, explainability and deterministic performance bounds are of particular interest.

Probabilistic sampling-based motion planners are particularly appropriate for high dimensional systems with complex environments and differential constraints. Sampling-based motion planners explore a configuration space by sampling states and connecting them to a roadmap or tree which represents a spatial connectivity and keeps track thereof. Typically, samples are drawn from a uniform distribution over a state space by an independent and identically distributed random variable.

The randomness of the sample sets shows a good exploration of the configuration space but comes at the expense of stochastic results which may strongly vary for each planning query in terms of planning efficiency and path quality. Hence, this stochastic approach makes a formal verification and validation of a motion planning algorithm for safety-critical applications difficult to obtain.

According to different approaches, the deterministic state sets can be used to achieve a deterministic planning behavior which allows an easier certification process for safety-critical applications. However, these deterministic approaches limit their applicability to Euclidian spaces, systems with linear affine dynamics and specific driftless systems.

SUMMARY

According to the present invention, a method for performing a sampling-based motion planning for a computer-controlled agent and a device and a computer-controlled agent are provided.

Further embodiments are described herein.

According to a first aspect of the present invention, a computer-implemented method for planning an optimized motion path is provided. In accordance with an example embodiment of the present invention, the optimized motion path is determined applying a sampling-based motion-planning algorithm depending on a sample node set including sample nodes, wherein the sample nodes in the sample node set are deterministically selected from a configuration node set including all obstacle free nodes, wherein the sample nodes are selected to optimize a dispersion criterion, wherein the dispersion criterion selects the sample nodes so that the largest uncovered area/space within the configuration node set is as small as possible.

The above method is based on an optimization-based approach to deterministic sampling. The planning method starts with a sampling set which is deterministically generated. The sample node set has sample nodes from which the optimal motion path is to be determined.

The sampling set is computed to minimize an actual dispersion of the samples. The dispersion criterion will need access to a steer function for computing an optimal path connecting two states. Particularly, uninformed batch-based algorithm such as PRM* can be used where the set of samples can be pre-computed offline.

It turned out that the dispersion metric in accordance with the present invention exhibits an improved planning efficiency and overall final path quality.

Furthermore, the sample nodes are chosen based on a dispersion matrix including dispersion values for each of the nodes of the configuration node set, wherein the nodes with the highest dispersion values are selected as sample nodes.

According to an example embodiment of the present invention, the dispersion values may be updated.

Moreover, the sample node set is determined as an obstacle-free node set.

The sampling-based motion-planning algorithm may correspond to a PRM* algorithm an FMT* algorithm.

Furthermore, the dispersion criterion may depend on a given steering function which defines constraints of movements in the configuration space.

According to an example embodiment of the present invention, a start node and a goal node 1 may be added to the sample node set to obtain a configuration node set, wherein collision-free or allowed edges between two sample nodes of the configuration node set being less distanced than a given radius are determined, wherein a shortest motion path between the start node and the goal node is determined along the determined collision-free or allowed edges, particularly according to the given steering function which defines constraints of movements in the configuration space.

According to a further aspect of the present invention, a method for operating an agent, such as a robot, an autonomous vehicle or the like, depending on a motion path is provided, wherein the motion path is optimized according to the above method.

According to a further aspect of the present invention, a device for planning an optimized motion path is provided. In accordance with an example embodiment of the present invention, the device is configured
  to determine the optimized motion path applying a sampling-based motion-planning algorithm depending on a sample node set including sample nodes, wherein the sample nodes in the sample node set are deterministically selected from a configuration node set including all obstacle free nodes,
  to select the sample nodes by optimizing a dispersion criterion, wherein the dispersion criterion selects the sample nodes so that the largest uncovered area/space within the configuration node set is as small as possible.

BRIEF DESCRIPTION OF THE DRAWINGS

Example embodiments of the present invention are described in more detail in conjunction with the figures.

FIG. 5 shows a pseudocode for the motion planning algorithm of FIG. 3, in accordance with an example embodiment of the present invention.

FIG. 6 shows a pseudocode for the algorithm of FIG. 4, in accordance with an example embodiment of the present invention.

FIG. 7 shows a pseudocode for an algorithm to determine if a border node is affected, in accordance with an example embodiment of the present invention.

DETAILED DESCRIPTION OF EXAMPLE EMBODIMENTS

Figure 1:
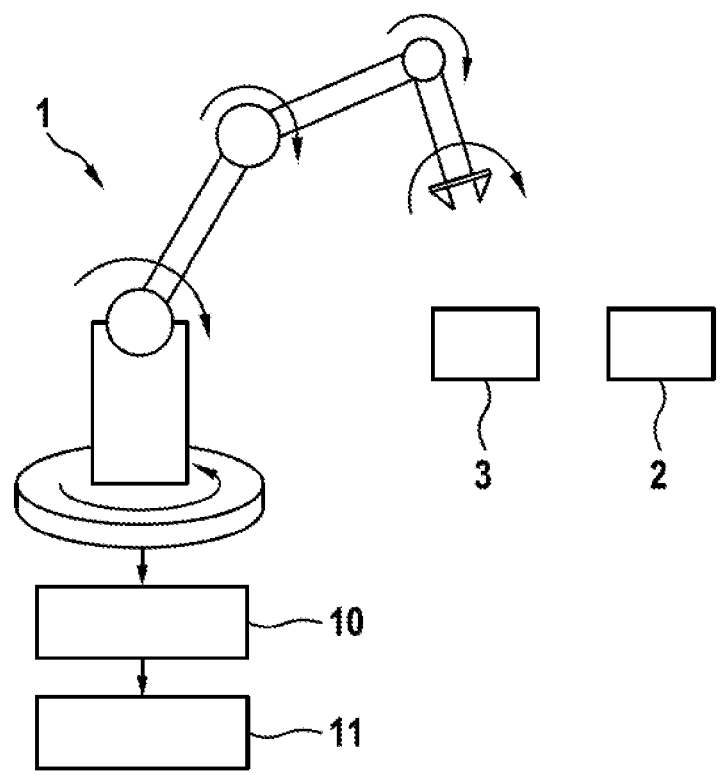
FIG. 1 schematically shows a system including a robot arm to be controlled by means of a planned motion trajectory, in accordance with an example embodiment of the present invention.

FIG. 1 schematically shows a robot arm 1 for handling objects in a partly occupied environment. The environment has static or dynamic obstacles 3 to which a collision shall be avoided. The robot arm 1 is configured to convey an object 2 in all space dimensions by gripping, moving and releasing the object 2 at predefined positions along a given trajectory.

The robot arm 1 is controlled by means of a control unit 10. The control unit 10 is coupled with a sensor system 11 capable of acquiring information about the actual state of the environment indicating blocked/occupied positions and free-to-move positions.

The trajectory planning algorithm, which is continuously performed in the control unit 10 considers the information about the environment and performs a motion planning algorithm to find an optimized trajectory of the motions of the robot arm 1. This allows the robot arm to grip and release objects 2 in the environment and move them along an optimized path of the trajectory even if the environment dynamically changes. The method for planning the corresponding motion path is described in detail below.

Figure 2:
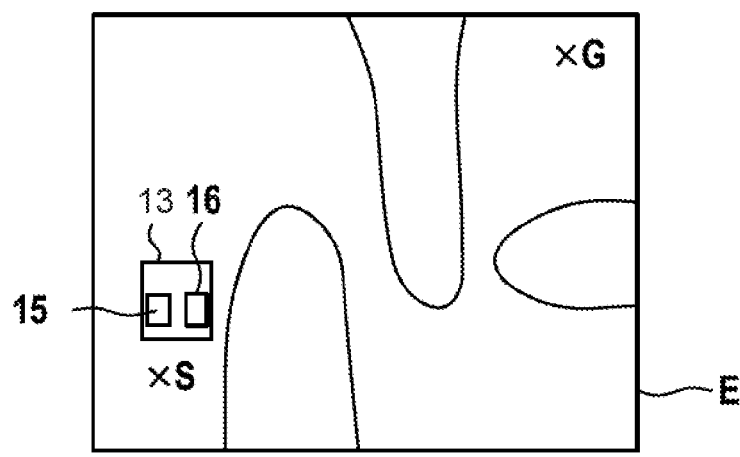
FIG. 2 schematically shows a system with an agent to be moved along a path generated by means of a motion-planning algorithm, in accordance with an example embodiment of the present invention.

FIG. 2 shows another example of a system wherein an agent, such as a self-moving robot 13, shall move through an environment from a start position S to a goal position G along an optimized path on a roadmap E. The roadmap E may change, e.g., due to "traffic", dynamic objects or other environmental conditions so that a replanning of the motion path may be required regularly. The robot 13 has a control unit 15 coupled with a sensor system 16. The sensor system 16 is capable of sensing or obtaining environment data and to provide map data based thereon. The map data may be used to determine a configuration space. The control unit 15 is configured to perform a motion planning algorithm to continuously update an optimized motion path based on a changed roadmap.

Figure 3:
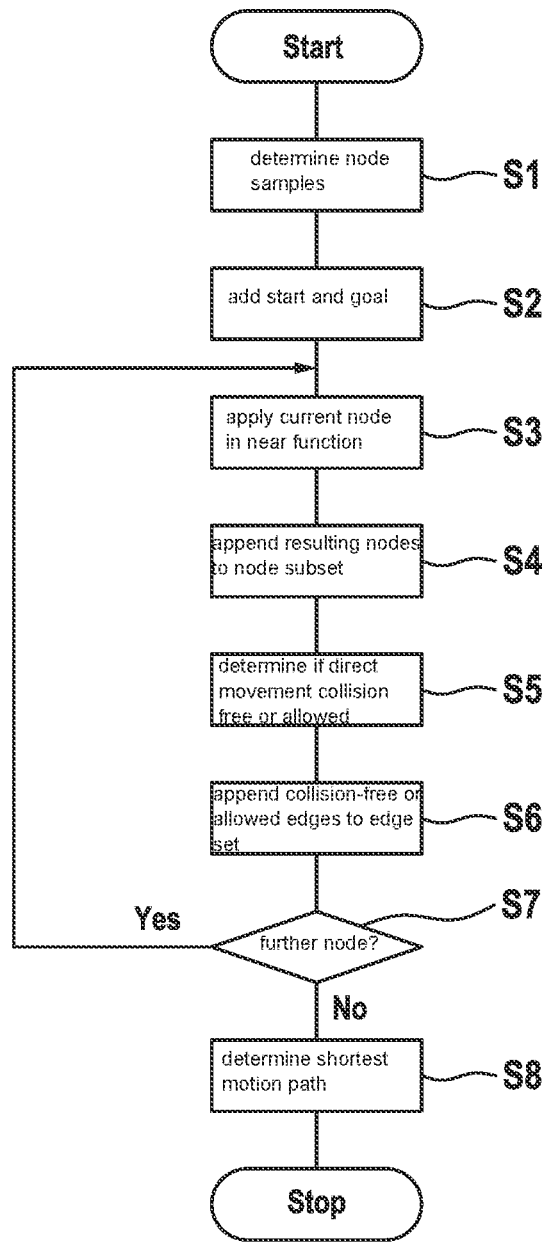
FIG. 3 shows a flowchart for illustrating a motion-planning algorithm, in accordance with an example embodiment of the present invention.

FIG. 3 shows a flowchart illustrating a sampling-based motion-planning algorithm. Furthermore, FIG. 5 shows a pseudocode indicating the process flow for the motion planning algorithm of FIG. 3. The described motion-planning algorithm is a sampling-based algorithm and substantially is based on a PRM* algorithm. Other algorithms such as FMT* can be applied as well. The motion planning algorithms shall make use of a deterministic sample node set S so that it can also be verified and used for safety-critical applications.

Referring to the PRM* algorithm, the sampling-based motion-planning algorithm basically starts in step S1 with determining a number of node samples each corresponding to an allowed position in the configuration space through which an optimized path shall be determined. This sample node set S contains a set of sample nodes x which represent locations each of which is obstacle-free (and free of positions which are too close to an obstacle). The detailed method for determining the sample node set S is described below in conjunction with FIG. 4.

In step S2, once the sample node set S has been determined, the start node $x_{start}$ and the goal node $x_{goal}$ are added to the sample node set S to obtain a configuration node set V.

According to a standard PRM*, a shortest path from the start node $x_{start}$ to the goal node $x_{goal}$ through the nodes x of the configuration node set V is determined. As a first step the PRM* algorithm builds a graph (composed of the node set V and edge set E), see Lines 3-11 of the pseudocode of FIG. 5. The process starts applying a first (or current) node v of the configuration node set V in step S3 in a NEAR function NEAR (v, V, r). The NEAR function returns for the considered node v all nodes of the configuration node set V which are distanced closer than r.

In other words, a resulting node subset U is generated which comprises all nodes which are neighboring the considered node within a predefined radius r.

In step S4 the resulting nodes are appended to the resulting node subset U. In steps S5, for each node u in the resulting node subset U, it is determined if a direct movement from the current node v to the respective node u in the node subset U is collision free or allowed.

In step S6, the resulting collision-free or allowed edges between the current node v and each of the subset nodes u are appended to an edge set E.

In step S7 it is checked if a further node v of the configuration node set V is to be considered for the edge determination of step S5. If positive (alternative: yes) the process is continued with step S3. If negative (alternative: no) the process is continued with step S8.

In step S8 according to a standard function SHORTEST-PATH ($x_{start}$, $x_{goal}$, (V,E)) the shortest motion path between the start node $x_{start}$ and the goal node $x_{goal}$ through the nodes of the configuration space using the collision-free edges determined by the edge set E is determined. The determination of the shortest path from the start node $x_{start}$ to the goal node $x_{goal}$ is straight-forward and not explained in detail herein. The shortest path procedure is generic. Standard algorithms that can be used are described in Hart, P. E. et al., "A formal basis for the heuristic determination of minimum cost paths", IEEE transactions on Systems Science and Cybernetics, 4(2), 100-107 and in Dijkstra, E. W., "A note on two problems in connexion with graphs." Numerische Mathematik 1.1 (1959): 269-271.

Figure 4:
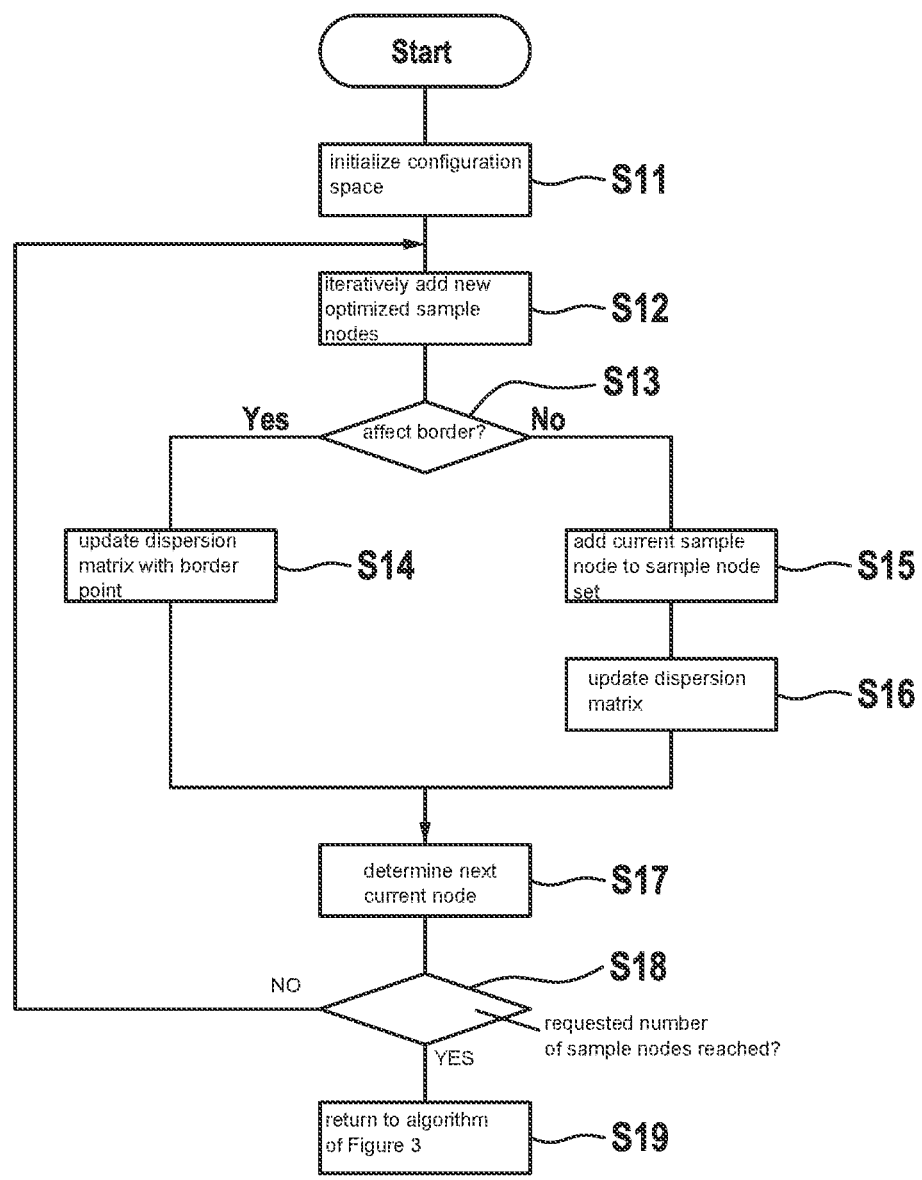
FIG. 4 shows a flowchart for illustrating an algorithm for determining a sample node set, in accordance with an example embodiment of the present invention.

Referring to FIG. 4 and the pseudocode of FIG. 6, the step S1 for determining the sample node set S is described in more detail.

Generally, for deterministic sampling-based motion planning algorithm, it may be a goal to optimize a dispersion criterion. The basic idea for the deterministic sampling-based motion-planning algorithm is to place sample nodes x into the sample node set S so that the largest uncovered area/space is as small as possible. Basically, the dispersion may be defined as the volume of the largest empty "sub- Riemannian ball" for non-holonomic robotic systems around the considered sample node or a hyperdimensional sphere for Euclidean spaces.

In step S11 a configuration space X is initialized which is approximated and discretized into a fine grid of $N_{cs}$ equidistant nodes x wherein the distance between neighboring nodes x can be equal or different per dimension. The configuration space X is a representation of the environment an agent or a part of an agent can move. A node is a representation of a position in this environmental space. An initial sample node x is chosen. Furthermore, an empty sample node set S is initialized.

A dispersion matrix D is initialized which keeps track of a minimum distance to either a border or a closest neighboring node for each node. The elements of the dispersion matrix (dispersion values) are each associated to one node in the configuration space X thereby having the same size and dimension of the configuration space X. Each element of the dispersion matrix is initially set to a high value which e.g. may be at least the full length of the corresponding dimension of the environmental space. In other words, each element of the dispersion matrix corresponds to the dispersion value of the related grid cell (the one used to approximate the configuration space).

The dispersion value for each sample node may be defined as a metric of a portion of the sample node set S that contains no other sample nodes. The metric may be measured using a steering function.

If it is possible to compute the distance to the border quickly, the dispersion matrix D can be initialized with the distance to the border for each node, otherwise the dispersion matrix D is initialized with ∞.

In step S12, the algorithm iteratively adds new optimized sample nodes x (up to $m_{samples} < N_{CS}$).

At each iteration, it is checked in step S13 if the initial selected sample node x or (for further iterations) the previous generated sample node x does not affect the border of the configuration space X (Function: AFFECTEDBORDERPOINT).

FIG. 7 shows a pseudocode for an algorithm for determining if the sample node x affects a border node. The node c referred to in the dispersion matrix which has a smaller distance to the sample node x than Dc or which affect a border point is correspondingly returned.

If the sample node x affects the border of the configuration space X (alternative: yes), the process is continued with step S14, otherwise (alternative: no) the process is continued with steps S15.

In step S14 the function AFFECTEDBORDERPOINT returns a node b (c in the pseudocode of FIG. 7) as an affected border node and the dispersion matrix is updated with the border point b (Function: UPDATEDISTANCEMATRIX). The dist function is the length of the path connecting two states (in this case c and x).

It is noted that this length may be different from the Euclidean distance. Instead, the length corresponds to a path which can be computed considering a given steering function, thus the nonholonomic constraints of the robot. The steering function includes the constraints of the movement of real world objects. For instance, a four-wheeled robot may be not allowed to turn on the spot, therefore its path between two points can be longer than the Euclidean distance between these points.

For a given node, the dispersion values may be updated with a flood-fill algorithm. A flood-fill algorithm is often used to compute a set of connected cells. Herein, with the flood-fill algorithm it is determined the distance field between the cells. Ideally, the flood-fill algorithm connects a given cell to its neighbors and updates the cost to reach the latter. Also in this case a Dijkstra Algorithm to visit all the cells of a grid can be used, as described in Dijkstra, E. W., "A note on two problems in connexion with graphs." Numerische Mathematik 1.1 (1959): 269-271.

In step S15, the current sample node x is added to the sample node set S and used to update the dispersion matrix D in step S16.

In step S17 a next current node x is determined by optimizing $x = \mathrm{argmax}_c D_c$ where Dc is a dispersion value of the element of the dispersion matrix. This means that the node c of the element of the dispersion matrix D is determined which has the highest value $D_c$.

In step S18 it is checked if the requested number $m_{samples}$ of sample nodes x has been reached. If positive (alternative: yes), the process will return the sample node set S to the algorithm of FIG. 3 (step S19). Otherwise (alternative: no) the process is continued with step S12.

In an alternative embodiment, the iteration to build the sample node set S can also be ended once a defined dispersion value has been reached. Here, the maximum dispersion value in the dispersion matrix can be checked. If this is lower than or equal to a desired value, the method can be halted.

The above algorithm for motion-planning ensures that an appropriate path can be determined if an allowed path through the environment exists. If a minimum clearance (distance between obstacles or minimum width of corridors or the like) is known in advance, the algorithm can be used to find a motion path with desired clearance. To achieve this, the defined maximum dispersion may be set to 2*(desired clearance). Further, the algorithm clearly indicates if an appropriate motion path through the environment does not exist.

What is claimed is:

1. A computer-implemented method for planning an optimized motion path, the method comprising the following steps:
   determining the optimized motion path is determined by applying a sampling-based motion-planning algorithm depending on a sample node set including sample nodes, wherein the sample nodes in the sample node set are deterministically selected from a configuration node set including only obstacle free nodes, and the sample nodes are selected to optimize a given dispersion criterion, wherein the given dispersion criterion selects the sample nodes so that a largest uncovered area/space within the configuration node set is minimized, wherein the sample nodes are chosen based on a dispersion matrix including dispersion values for each of the obstacle free nodes of the configuration node set, wherein the obstacle free nodes with the highest dispersion value are selected as the sample nodes.

2. The method according to claim 1 wherein the dispersion values are updated with a flood-fill algorithm.

3. The method according to claim 1 wherein the sample node set is determined as an obstacle-free node set.

4. The method according to claim 1, wherein the sampling-based motion-planning algorithm corresponds to a PRM* algorithm or an FMT* algorithm.

5. The method according to claim 1, wherein a start node and a goal node are added to the sample node set, wherein collision-free or allowed edges between two sample nodes of the configuration node set being less distanced than a given radius are determined, wherein a shortest motion path between the start node and the goal node is determined along the collision-free or allowed edges edges according to a given steering function which defines constraints of movements in a configuration space.

6. A method for operating an agent, comprising the following steps:
 determining an optimized motion path is determined by applying a sampling-based motion-planning algorithm depending on a sample node set including sample nodes, wherein the sample nodes in the sample node set are deterministically selected from a configuration node set including all obstacle free nodes, and the sample nodes are selected to optimize a given dispersion criterion, wherein the given dispersion criterion selects the sample nodes so that a largest uncovered area/space within the configuration node set is minimized; and
 operating the agent using the optimized motion path, wherein the sample nodes are chosen based on a dispersion matrix including dispersion values for each of the obstacle free nodes of the configuration node set, wherein the obstacle free nodes with the highest dispersion value are selected as the sample nodes.

7. A device for planning an optimized motion path, wherein the device is configured to:
 determine the optimized motion path by applying a sampling-based motion-planning algorithm depending on a sample node set including sample nodes, wherein the sample nodes in the sample node set are deterministically selected from a configuration node set including all obstacle free nodes; and
 select the sample nodes by optimizing a dispersion criterion, wherein the dispersion criterion selects the sample nodes so that a largest uncovered area/space within the configuration node set is minimized, wherein the sample nodes are chosen based on a dispersion matrix including dispersion values for each of the obstacle free nodes of the configuration node set, wherein the obstacle free nodes with the highest dispersion value are selected as the sample nodes.

8. A non-transitory computer readable medium on which is stored a computer program for planning an optimized motion path, the computer program, when executed by a computer, causing the computer to perform the following steps:
 determining the optimized motion path is determined by applying a sampling-based motion-planning algorithm depending on a sample node set including sample nodes, wherein the sample nodes in the sample node set are deterministically selected from a configuration node set including all obstacle free nodes, and the sample nodes are selected to optimize a given dispersion criterion, wherein the given dispersion criterion selects the sample nodes so that a largest uncovered area/space within the configuration node set is minimized, wherein the sample nodes are chosen based on a dispersion matrix including dispersion values for each of the obstacle free nodes of the configuration node set, wherein the obstacle free nodes with the highest dispersion value are selected as the sample nodes.

* * * * *